United States Patent
Decker et al.

(10) Patent No.: US 9,762,486 B2
(45) Date of Patent: *Sep. 12, 2017

(54) METHOD AND SYSTEM FOR USING EXTENSION HEADERS TO SUPPORT PROTOCOL STACK MIGRATION

(71) Applicant: Landis+Gyr Innovations, Inc., Alpharetta, GA (US)

(72) Inventors: David Decker, Alpharetta, GA (US); Vishal Kumar, Ghaziabad (IN); Jeffrey Shudark, Cumming, GA (US)

(73) Assignee: Landis+Gyr Innovations, Inc., Alpharetta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/084,946

(22) Filed: Mar. 30, 2016

(65) Prior Publication Data
US 2016/0212045 A1    Jul. 21, 2016

Related U.S. Application Data

(63) Continuation of application No. 13/750,424, filed on Jan. 25, 2013, now Pat. No. 9,338,089.

(51) Int. Cl.
| | |
|---|---|
| H04L 12/28 | (2006.01) |
| H04L 12/741 | (2013.01) |
| H04L 12/725 | (2013.01) |
| H04L 12/733 | (2013.01) |
| H04L 12/801 | (2013.01) |

(Continued)

(52) U.S. Cl.
CPC ........... *H04L 45/74* (2013.01); *H04L 45/122* (2013.01); *H04L 45/306* (2013.01); *H04L 47/17* (2013.01); *H04L 69/161* (2013.01); *H04L 45/741* (2013.01); *H04L 69/22* (2013.01)

(58) Field of Classification Search
None
See application file for complete search history.

(56) References Cited

U.S. PATENT DOCUMENTS

| | | |
|---|---|---|
| 6,760,309 B1 | 7/2004 | Rochberger et al. |
| 2003/0053486 A1* | 3/2003 | Okamori ......... H04L 29/06 370/474 |

(Continued)

FOREIGN PATENT DOCUMENTS

| | | |
|---|---|---|
| WO | 2014116409 | 7/2014 |

OTHER PUBLICATIONS

Advisory Action for U.S. Appl. No. 13/750,424, dated Apr. 28, 2015, 2 pages.

(Continued)

*Primary Examiner* — Kibrom T Hailu
(74) *Attorney, Agent, or Firm* — Kilpatrick Townsend & Stockton LLP

(57) ABSTRACT

An IP packet may include an IP header and one or more optional IP extension headers. The packet may contain non-IP protocol data in one of the IP extension headers. An application that uses non-IP protocol data may use the non-IP protocol data from the IP extension header. This allows an application designed for a non-IP protocol stack to operate on a device with an IP protocol stack with minimal modification. The non-IP protocol data may alternatively support non-IP routing options within a network or subnetwork.

14 Claims, 7 Drawing Sheets

(51) Int. Cl.
*H04L 29/06* (2006.01)
*H04L 12/749* (2013.01)

(56) References Cited

U.S. PATENT DOCUMENTS

| | | |
|---|---|---|
| 2003/0126291 A1 | 7/2003 | Wang et al. |
| 2005/0058129 A1 | 3/2005 | Jones et al. |
| 2005/0286455 A1 | 12/2005 | Fernandes et al. |
| 2006/0018317 A1 | 1/2006 | Jimmei |
| 2006/0159088 A1 | 7/2006 | Aghvami et al. |
| 2006/0291446 A1* | 12/2006 | Caldwell ............. H04L 45/42 370/351 |
| 2007/0055472 A1 | 3/2007 | O'Toole |
| 2007/0286393 A1 | 12/2007 | Roever et al. |
| 2007/0297405 A1* | 12/2007 | He ............. H04L 45/00 370/389 |
| 2008/0002588 A1* | 1/2008 | McCaughan ......... H04L 45/04 370/238 |
| 2008/0025308 A1* | 1/2008 | Morgan ............. H04L 69/16 370/392 |
| 2008/0027923 A1 | 1/2008 | George et al. |
| 2008/0159287 A1* | 7/2008 | Nagarajan ........... H04L 12/66 370/392 |
| 2008/0181216 A1 | 7/2008 | Breau et al. |
| 2009/0219941 A1* | 9/2009 | Cardozo ............ H04L 12/42 370/406 |
| 2010/0142533 A1 | 6/2010 | Hall, Jr. et al. |
| 2010/0172249 A1* | 7/2010 | Liu ................. H04L 45/124 370/252 |
| 2012/0099589 A1 | 4/2012 | Kato |
| 2014/0148152 A1 | 5/2014 | Periyalwar et al. |
| 2014/0211798 A1 | 7/2014 | Decker et al. |

OTHER PUBLICATIONS

Final Office Action for U.S. Appl. No. 13/750,424, dated Sep. 9, 2015, 15 pages.
Final Office Action for U.S. Appl. No. 13/750,424, dated Feb. 4, 2015, 18 pages.
Non-Final Office Action for U.S. Appl. No. 13/750,424, dated Aug. 4, 2014, 15 pages.
Notice of Allowance for U.S. Appl. No. 13/750,424, dated Jun. 5, 2015, 18 pages.
Notice of Allowance for U.S. Appl. No. 13/750,424, dated Jan. 11, 2016, 5 pages.
Deering et al., "Internet Protocol, Version 6 (IPv6) Specification," Network Working Group, Request for Comments: 2460, Dec. 1998, 39 pages.
Office Action for Mexican Application No. MX/A/2015/009175, dated Sep. 25, 2015, 2 pages.
Internat'ional Preliminary Report on Patentability for PCT/US2014/010431, dated Aug. 6, 2015, 10 pages.
International Search Report and Written Opinion for PCT/US2014/010431, dated May 22, 2014, 12 pages.

* cited by examiner

METHOD AND SYSTEM FOR USING EXTENSION HEADERS TO SUPPORT PROTOCOL STACK MIGRATION

CROSS-REFERENCE TO RELATED APPLICATIONS

This application is a continuation application of U.S. application Ser. No. 13/750,424, filed Jan. 25, 2013, now allowed, which is incorporated herein by reference in its entirety.

FIELD OF THE INVENTION

This invention relates generally to preserving protocol data when migrating to a new protocol stack and more particularly to using extension headers to carry protocol data.

BACKGROUND

Some utility networks, such as RF-based Neighborhood Area Networks (NANs) used for Advance Metering Infrastructure (AMI) or Smart Grid communication use a proprietary protocol stack and layered or geographic routing. The nodes of such a network may include utility meters, utility servers and routers. In some networks, the boundary between an application that runs on a node in a proprietary network and a proprietary protocol stack may not be well defined, i.e., the application may not be independent of the underlying protocol stack and may require information from the underlying protocol stack in order to process a packet. This lack of modularity may become a problem when a network with nodes that use a proprietary protocol stack needs to become IP (Internet Protocol) compliant. For example, there may be a problem when an application designed to operate on a non-IP protocol stack requires information from a lower layer, but the information is not present in an IP header, or when an application or other software module at an upper layer processes packets received from a lower layer of a proprietary protocol stack.

One way to allow a non-IP node to communicate in an IP network is to convert the node to an IP compliant node. Converting an application which is designed to operate on a non-IP protocol stack to an IP protocol stack typically requires changes to the logic of the application, i.e., that the application is re-developed for the IP protocol stack. This conversion is likely to be both time consuming and costly. Another way to allow a non-IP node to communicate in an IP network is to use tunneling. Tunneling encapsulates a first protocol within a second protocol to allow a packet formed using the first protocol to be communicated via a network that uses the second protocol. However, tunneling requires additional processing power, additional memory, and additional headers, which reduces over-the-air efficiency.

Thus, there is a need for a better way of adapting an application designed for a non-IP protocol stack to an IP protocol stack.

SUMMARY

Aspects of the invention allow an application designed for a non-IP protocol stack to operate with an IP protocol stack with minimal modification. One aspect of the invention uses an Internet Protocol, Version 6 (IPv6) packet with an IPv6 header and one or more optional IPv6 extension headers. The term "IPv6 header" includes the IPv6 header defined in Internet Protocol, Version 6 (IPv6) Specification, RFC 2460 ("RFC 2460"), and is commonly referred to as an IPv6 fixed header. The term "IPv6 extension header" includes the optional IPv6 extension headers defined in RFC 2460. The term "non-IP protocol data" as used herein includes data that is not defined as part of the relevant IP header, e.g., an IPv6 header. Aspects of the invention communicate non-IP protocol data, which is needed by the applications by placing it in one or more extension headers, such as an IPv6 extension header. The non-IP protocol data is available for those nodes that use it, but may be simply passed along by other nodes that do not use it.

In one aspect of the invention a utility network interfaces with an IPv6 network. The nodes within the utility network include utility meters and a collector. The collector communicates between the utility network and the IPv6 network. The nodes within the utility network include applications designed for a non-IP protocol stack that have been minimally modified to operate with an IPv6 protocol stack. Typically the modifications include making the applications socket based. The applications may continue to use non-IP protocol data to make routing decisions or take other actions within the utility network since the non-IP protocol data is available in an IPv6 extension header. When a packet is communicated from the utility network to the IPv6 network, the packet continues to include the non-IP protocol data in an IPv6 extension header. Although the nodes in the IPv6 network may not use the non-IP protocol data, the nodes pass along the non-IP protocol data so that the non-IP protocol data is available to the destination node, which may or may not use the non-IP protocol data.

By placing the non-IP protocol data in an IPv6 extension header, the data remains available to the application and thus allows the application to be reused on an IPv6 stack with minimal modifications.

These illustrative aspects and features are mentioned not to limit or define the invention, but to provide examples to aid understanding of the inventive concepts disclosed in this application. Other aspects, advantages, and features of the present invention will become apparent after review of the entire application.

BRIEF DESCRIPTION OF THE DRAWINGS

These and other features, aspects, and advantages of the present disclosure are better understood when the following Detailed Description is read with reference to the accompanying drawings, where.

DETAILED DESCRIPTION

Aspects of the invention support applications that use non-IP protocol data by placing the non-IP protocol data in an IP extension header. An IP packet includes an IP or base header and one or more optional IP extension headers. By placing the non-IP protocol data in the IP extension header, the data is available to applications, which allows an application designed for a non-IP protocol stack to operate on a device with an IP protocol stack with minimal modifications.

IP and Extension Headers

Figure 1:
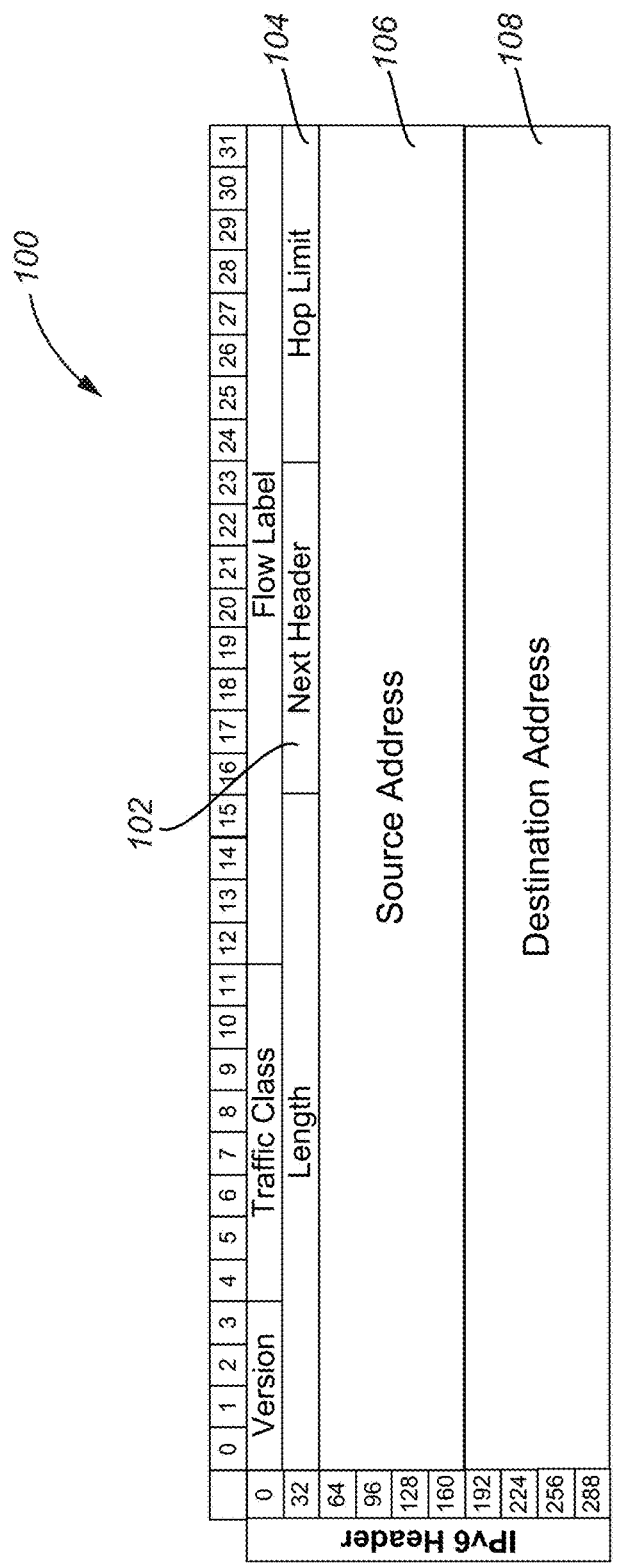
FIG. 1 is a block diagram illustrating an IPv6 header.

FIG. 1 illustrates an IP header as defined by RFC 2460. The header 100 includes a next header field 102, a hop limit field 104, a source address 106, and a destination address 108. The next header field indicates the type of header immediately following the IPv6 header. IPv6 provides for a small number of extension headers that can follow the IPv6 header, including a hop-by-hop extension header and a destination extension header. The value in the hop limit field is decremented by 1 by each node that forwards the packet. The packet is discarded when the value in the hop limit field is 0. The source address identifies the originator of the packet and the destination address identifies the intended recipient of the packet.

Figure 2:
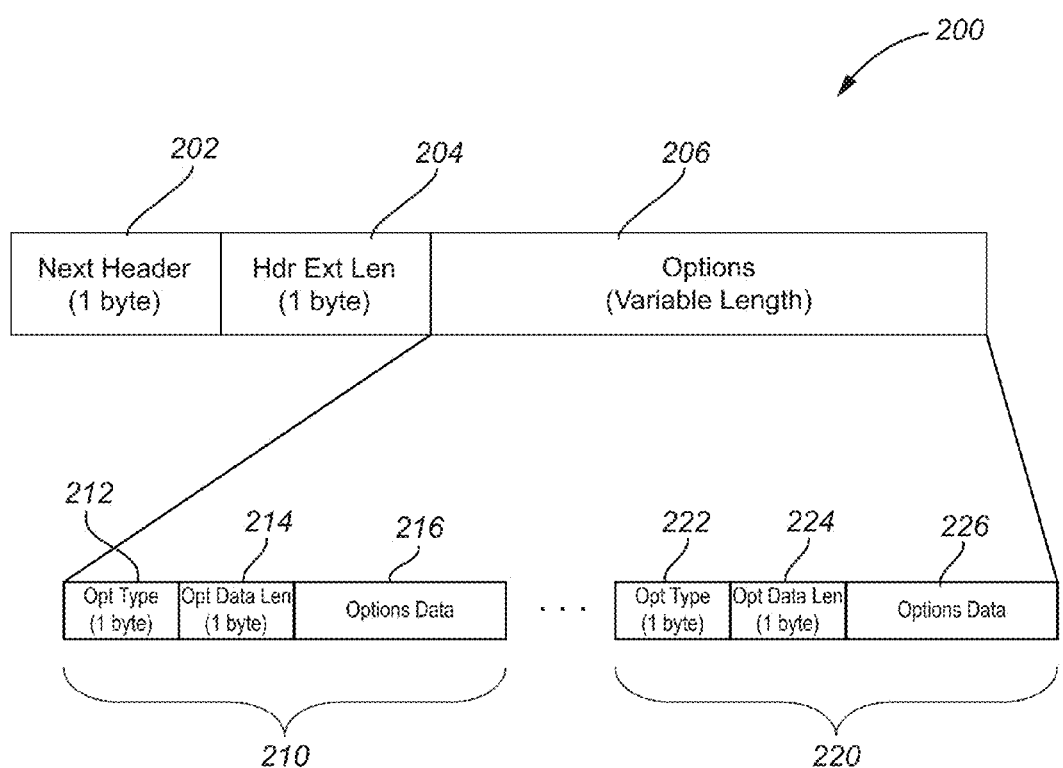
FIG. 2 is a block diagram illustrating an IPv6 extension header.

FIG. 2 illustrates an IPv6 hop-by-hop extension header. The extension header 200 includes a next header field 202, a header length field 204, and an options field 206. The next header field is similar to the next header field in the header in that it identifies the type of header immediately following the hop-by-hop extension header. The header length field indicates the length of the options field. The options field includes one or more type-length-value (TLV) encoded options. FIG. 2 illustrates a first TLV option 210 and a last TLV option 220. Each TLV option includes an option type field 212, 222, an option length field 214, 224, and an option data field 216, 226. A destination extension header is similar to a hop-by-hop extension header in that it also includes a next header field, a header length field, and an options field with one or more TLV encoded options.

Figure 3:
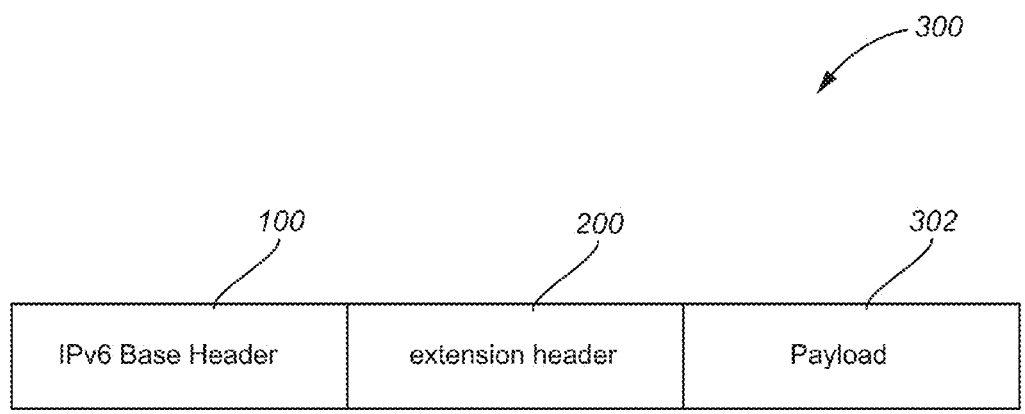
FIG. 3 is a block diagram illustrating an exemplary IPv6 packet.

FIG. 3 illustrates an IPv6 packet 300 with an IPv6 header 100, such as that illustrated in FIG. 1, an IPv6 extension header 200, such as that illustrated in FIG. 2, and a payload 302. The extension header may be any extension header, including a hop-by-hop extension header or a destination extension header. A packet may include multiple extension headers, although only one extension header is shown in FIG. 3. If so, then the extension headers immediately follow one another.

Figure 4:
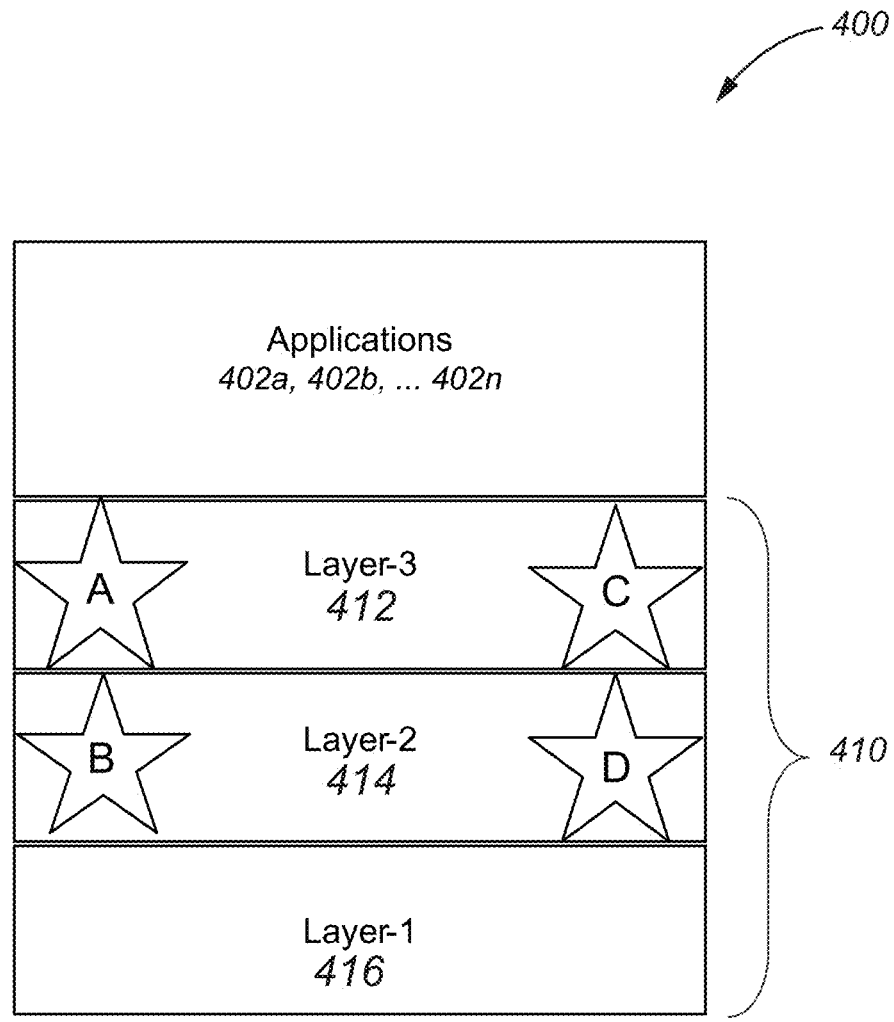
FIG. 4 is a block diagram illustrating an exemplary device using a non-IP protocol stack.

FIG. 4 illustrates the challenges involved in migrating an application designed for a non-IP protocol stack to an IPv6 protocol stack. In FIG. 4 a device 400 uses a non-IP protocol stack 410. The device includes one or more applications, 402a, 402b, . . . 402n, in an application layer. The exemplary protocol stack is below the application layer and includes 3 layers: Layer-1, 416, Layer-2, 414, and Layer-3, 412. Information that is available from the lower layers and used by one or more of the applications is illustrated by the stars in FIG. 4. For example, application 402a may need information from Layer-3 represented by stars A and C and may need information from Layer-2 represented by stars B and D in order to function correctly.

In this example, only the information represented by star A would be available from an IPv6 stack. Thus, if application 402a is to operate on a device with an IPv6 stack, the application would need to be substantially modified since the information represented by stars B, C, and D would no longer be available. To avoid having to substantially modify the application, aspects of the invention place the non-IP protocol data into an IPv6 extension header. For purposes of this example, non-IP protocol data is data that is associated with a layer below the application layer and that is not defined in the IPv6 header. If the non-IP protocol data is placed in an IPv6 extension header, then the modification to the application to allow it to operate on a device with an IPv6 stack are relatively minor. Typically the modification relates to changing the application from a non-socket based application to a socket based application so that the application uses a socket interface for communicating with the lower layers.

Figure 5:
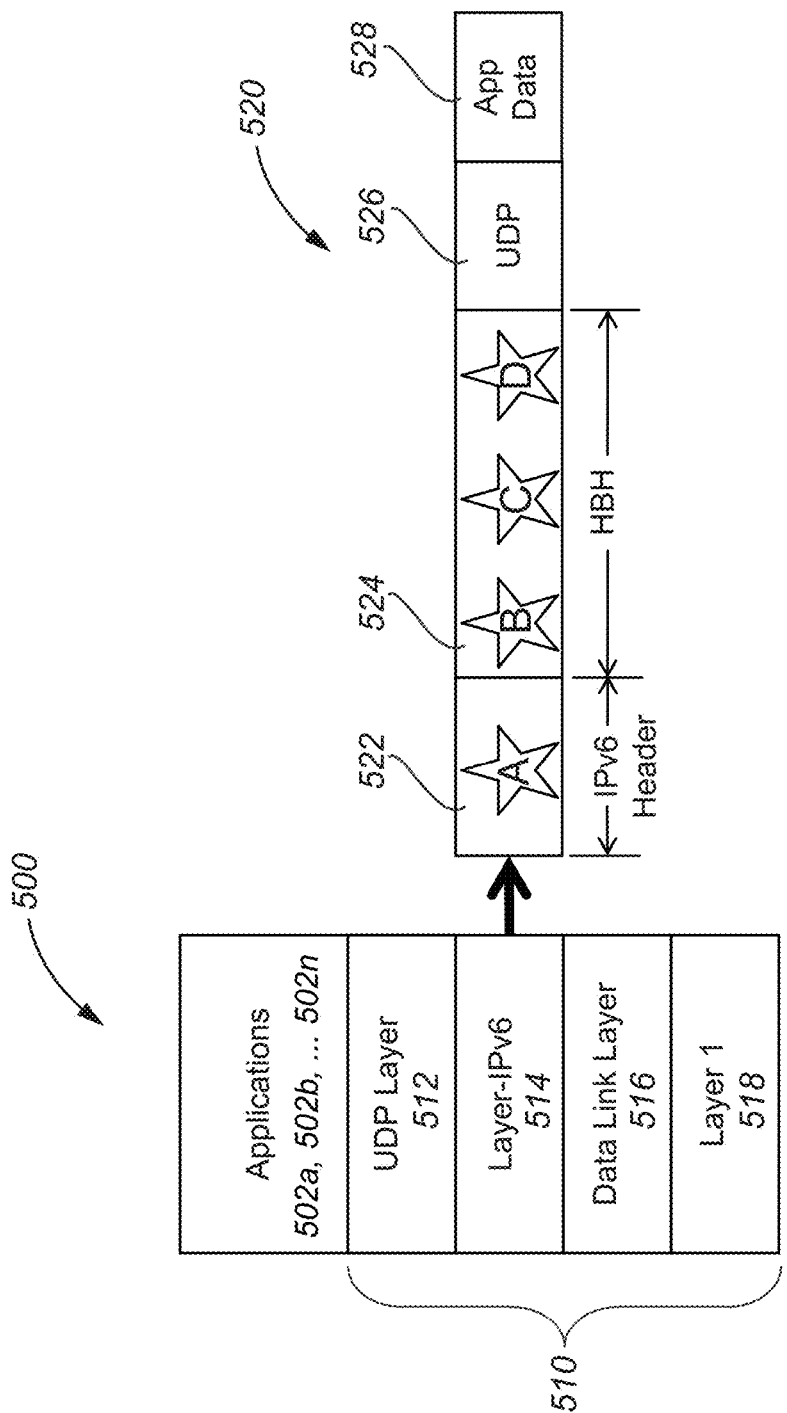
FIG. 5 is a block diagram illustrating an exemplary device using an IP protocol stack.

FIG. 5 illustrates the operation of a device 500 that uses an IPv6 protocol stack 510. The device includes one or more applications, 502a, 502b, . . . 502n, in an application layer. Application 502a is similar to application 402a in FIG. 4 in that it requires the information illustrated by stars A, B, C, and D, but it is socket based. The layers of the IPv6 protocol stack 510 are below the application layer and include transport layer, 512, such as UDP (User Datagram Protocol) or TCP (Transmission Control Protocol), IPv6 Internet layer, 514, data link layer, 516, and layer 1, 518. The device creates an IPv6 packet 520, which includes an IPv6 header 522, an IPv6 hop-by-hop extension header 524, a UDP field 526 and an application data field 528. In this example, the information associated with star A is included in the header because the information can be mapped to the IPv6 header. For example, the information associated with star A may be the hop limit. However, the information associated with stars B, C, and D is included in the hop-by-hop extension header because the information cannot be mapped to the IPv6 header. In this manner the information associated with stars B, C, and D will be available to an application even though the information is not the type that can be mapped to the header.

Another aspect of the invention may be used in a device that uses an IPv6 protocol stack to support a first application that requires non-IP protocol data and a second application that does not require non-IP protocol data. In this situation, the two applications co-exist on the same device and use the same IPv6 protocol stack. A packet associated with the first application may include an IPv6 extension header that includes the non-IP protocol data, whereas a packet associated with the second application may not need to include an IPv6 extension header.

Another aspect of the invention may be used by a device to implement a routing method associated with a non-IP protocol stack instead of IP address based routing. In this case, both IP address based routing and non-IP protocol stack based routing can co-exist in the network. To support both types of routing, an IPv6 packet includes a hop-by-hop extension header that carries the data needed for the non-IP protocol stack routing.

Exemplary Operating Environment

Figure 6:
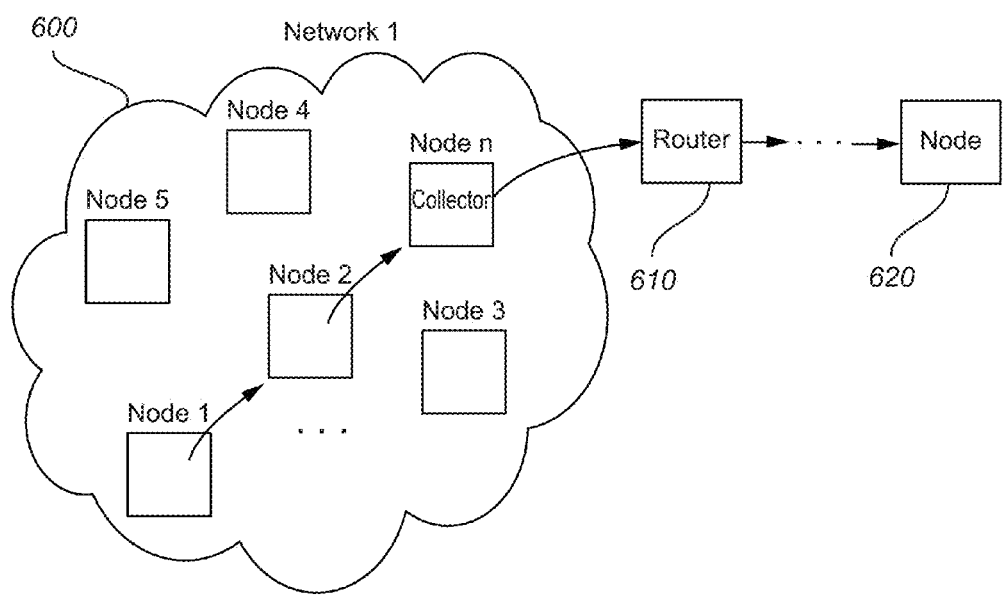
FIG. 6 is a block diagram illustrating an exemplary operating environment for the device of FIG. 5.

FIG. 6 illustrates a network, Network 1 600 that includes a number of nodes, Node 1, Node 2, . . . Node n. In one example, the nodes include utility meters and a collector. The utility meters include any type of utility endpoint or measuring device. The collector collects data from the nodes and may or may not include a utility meter. The collector communicates with a node that is outside of network 1. In some instances the collector communicates directly with the destination node for the data from Network 1, but in other instances the collector communicates with a node that simply forwards the information received from the collector on to another node, so that the information passes through multiple intervening nodes before reaching the destination node 620. Each node may include a processor, a memory device, and a communication device for communicating with other nodes. Communication between nodes may be via wireless communication, wired communication, or any other type of communication.

The processor can be any suitable processing device or group of devices configured to execute instructions stored in the memory. Non-limiting examples of the processor can include a microprocessor, a mixed signal microcontroller, an application-specific integrated circuit ("ASIC"), a field-programmable gate array ("FPGA"), or other suitable device. The memory can be any suitable non-transitory computer-readable medium for storing computer-executable program instructions, such as firmware or other operating instructions for controlling one or more hardware components of a node. A non-transitory computer-readable medium may include, but is not limited to, an electronic, optical, magnetic, or other storage device capable of providing a processor with computer-readable instructions. Other examples include, but are not limited to, a memory chip, ROM, RAM, an ASIC, a configured processor, optical storage, or any other medium from which a computer processor can read instructions. The instructions may include processor-specific instructions generated by a compiler and/or an interpreter from code written in any suitable computer-programming language.

The nodes within Network 1 may include applications that require non-IP protocol data. Examples of non-IP protocol data include, but are not limited to, non-IP address data, such as a WAN address, routing information, message/fragment IDs (different from IPv6 fragmentation and reassembly), security/encryption types, and TTL (time to live). In one instance, the applications may have been originally designed for a non-IP stack and may still require certain non-IP protocol data, but may otherwise be capable of running on an IP protocol stack.

FIG. 6 illustrates that a packet from Node 1 may be routed to Node 2, then routed to Node n. Node n routes the packet outside Network 1 to router 610. The packet is then routed to its destination node 620, through any number of additional intervening nodes.

The routing within Network 1 may be based, at least in part, on non-IP protocol data. Node 1 may decide to route the packet from Node 1 to Node 2 based, at least in part, on non-IP protocol data. Similarly, Node 2 may decide to route the packet from Node 2 to Node n based, at least in part, on non-IP protocol data. The non-IP routing data used by Node 2 may differ from the non-IP routing data used by Node 1. The routing data may include information needed to implement various routing options, such as persistent routing, quick routing, or reliable routing. For example, to implement persistent routing, it is necessary to know which nodes are battery-backed nodes and to use only battery-backed nodes for routing. To implement link quick routing, it is necessary to know link quality and to use that information to make routing decisions. To implement reliable routing, it is necessary to know a preconfigured short hop length since a packet is routed through nodes which are not farther away than the preconfigured short hop length. Node n routes the packet to router 610, which is outside Network 1. Node n may use non-IP protocol data and/or IP data in deciding to route the packet to the router. Router 610 and other nodes between router 610 and node 620 may route the packet based only on the IP data.

Figure 7:
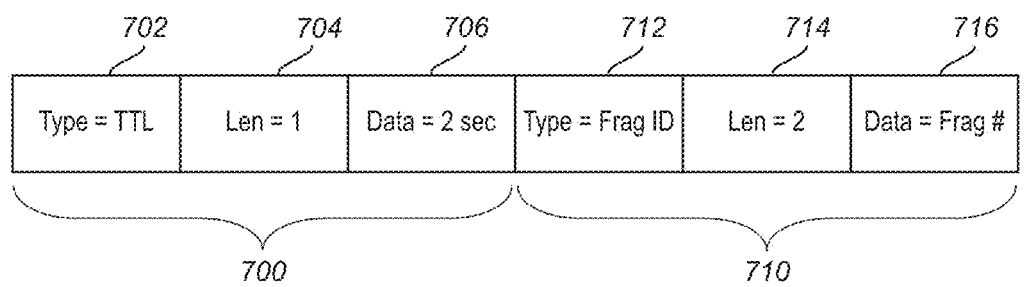
FIG. 7 is a block diagram illustrating an exemplary extension header.

To allow the nodes within Network 1 to base their routing decisions on non-IP protocol data, the nodes use packets that include an IP header and an IP extension header that includes non-IP protocol data. In one example, the IP extension header is a hop-by-hop extension header and the non-IP protocol data includes TTL and a fragment ID. FIG. 7 illustrates two hop-by-hop options, 700, 710, both of which use a TLV format. The first option 700 is related to TTL and includes a type field 702 indicating TTL, a length field 704 indicating 1 byte, and a data field 706 that includes a number of seconds. In this example, the nodes in Network 1 use the TTL data to determine when to discard a packet. There is a predetermined threshold for TTL for Network 1, which is represented by a number of seconds or milliseconds. Once that threshold is reached, then the packet is discarded. For the nodes in Network 1, the TTL data overrides the IP hop count data, so that if the TTL threshold is reached the packet is discarded even if the hop count is non-zero. Router 610 and other nodes outside Network 1 may ignore the TTL data and thus may rely only upon the IP hop count to determine whether to discard a packet.

The second option 720 is related to fragmentation and includes a type field 712 indicating fragmentation, a length field 714 indicating 2 bytes, and a data field 716 that includes a fragment ID number. In this example, the applications running on the nodes in Network 1 use a different message length than that provided by IP and use the fragment ID numbers to support the different message length.

According to the IPv6 protocol, each node examines the hop-by-hop extension header. Since the router 610 and any intervening nodes may not need the information in the hop-by-hop extension header, they may ignore the information, but continue to pass it along. In this manner, the information is available to the destination node 620. In one example, a node outside Network 1 ignores the hop-by-hop extension header when a bit is set. In another example, the router 610 and possibly an intervening node examine the hop-by-hop extension header and process the data.

Aspects of the invention may be used to provide a trace route function. For example, each node that handles a packet may add its address to the hop-by-hop extension header so that once the packet reaches the destination node, the destination node can identify the path taken by the packet. This trace route function can be used regardless of whether other information in the hop-by-hop extension header is being used to make routing decisions.

In another example, the destination extension header is used instead of the hop-by-hop extension header. Unlike the hop-by-hop extension header, which is examined by each node, the destination extension header is only examined by the destination node, in system that is IPv6 compliant. In this situation, the originating node may include information, such as routing information, in the destination extension header that is intended for the destination node. The nodes in Network 1 may make routing decisions based on other information, such as information hard coded at the nodes. In this manner, the routing information provided by the originating node is sent to the destination node and the routing decisions within Network 1 are made using non-IP protocol data.

In an alternative example that is not IP compliant, the nodes within Network 1 may be designed to examine the destination extension header even though they are not required to under the IP protocol. If so, then the non-IP protocol data used to make routing decisions within Network 1 may be placed in the destination extension header.

In yet another example, the non-IP protocol data is divided between multiple extension headers. For example, non-IP protocol data used to make routing decisions in Network 1 may be placed in the hop-by-hop extension header and non-IP protocol data related to security may be placed in another extension header, such as the destination extension header.

Numerous specific details are set forth herein to provide a thorough understanding of the claimed subject matter.

However, those skilled in the art will understand that the claimed subject matter may be practiced without these specific details. In other instances, methods, apparatuses, or systems that would be known by one of ordinary skill have not been described in detail so as not to obscure claimed subject matter. For example, the use of an application in the foregoing description of the invention is a non-limiting example. The invention is not limited to an application or to a particular type of non-IP protocol stack. The invention is also not limited to using non-IP protocol data for routing, but may include any data that is used by the nodes within the network, but is not provided by the IP protocol stack. Furthermore the invention is not limited to the specific examples of IPv6 and extension headers used herein and may be used in other versions of IP as appropriate.

Some portions are presented in terms of symbolic representations of operations on data bits or binary digital signals stored within a computing system memory, such as a computer memory. These representations are examples of techniques used by those of ordinary skill in the data processing arts to convey the substance of their work to others skilled in the art. Operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other storage devices, transmission devices, or display devices of the computing platform.

The system or systems discussed herein are not limited to any particular hardware architecture or configuration. A computing device can include any suitable arrangement of components that provide a result conditioned on one or more function calls. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method for routing within a first network, wherein the first network includes a first node, a second node, and a third node, comprising:
    receiving, at the second node, a first packet from the first node, wherein the first packet has a first IP fixed header, a first hop-by-hop extension header, and a first payload and wherein the first hop-by-hop extension header comprises routing data needed to implement a selected routing option which is selected from one of the following: persistent routing, quick routing, or reliable routing;
    using the routing data in the first hop-by-hop extension header by the second node to select the third node;
    generating a second packet by the second node having a second IP fixed header, a second hop-by-hop extension header, and a second payload, wherein the second hop-by-hop extension header includes routing data to implement the selected routing option; and
    transmitting the second packet from the second node to the third node.

2. The method of claim 1, further comprising:
    receiving the second packet at the third node;
    using the routing data in the second IP fixed header to select a fourth node, wherein the fourth node is located outside of the first network;
    generating a third packet having a third IP fixed header, a third hop-by-hop extension header, and a third payload; and
    transmitting the third packet to the fourth node.

3. The method of claim 1, wherein generating a second packet comprises including data from the second node in the second hop-by-hop extension header.

4. The method of claim 1, wherein the routing data needed to implement persistent routing comprises information identifying nodes that are battery backed.

5. The method of claim 1, wherein the routing data needed to implement quick routing comprises information indicating link quality.

6. The method of claim 1, wherein the routing data needed to implement reliable routing comprises information indicating a short hop length.

7. A device associated with a second node in a network, comprising:
    a communication device for communicating with other nodes in the network;
    a processor for executing instructions so that the device performs operations comprising:
        receiving, at the second node, via the communication device a first packet from a first node, wherein the first packet has a first IP fixed header, a first hop-by-hop extension header, and a first payload and wherein the first hop-by-hop extension header comprises routing data needed to implement a selected routing option which is selected from one of the following: persistent routing, quick routing, or reliable routing;

using the routing data in the first hop-by-hop extension header by the second node to select a third node;

generating a second packet by the second node having a second IP fixed header, a second hop-by-hop extension header, and a second payload, wherein the second hop-by-hop extension header includes routing data to implement the selected routing option; and transmitting the second packet from the second node to the third node via the communication device.

8. The device of claim 7, wherein the device is configured to perform operations further comprising:

receive the second packet at the third node;

select a fourth node using the routing data in the second IP fixed header, wherein the fourth node is located outside of the first network;

generate a third packet having a third IP fixed header, a third hop-by-hop extension header, and a third payload; and transmit the third packet to the fourth node.

9. The device of claim 7, wherein the operation to generate a second packet comprises including data from the device in the second hop-by-hop extension header.

10. The device of claim 7, wherein the routing data needed to implement persistent routing comprises information identifying nodes that are battery backed.

11. The device of claim 7, wherein the routing data needed to implement quick routing comprises information indicating link quality.

12. The device of claim 7, wherein the routing data needed to implement reliable routing comprises information indicating a short hop length.

13. A method for executing an application, comprising:

receiving at a second node, a first packet from a first node, wherein the first packet has a first IP fixed header, a first hop-by-hop extension header, and a first payload and wherein the first hop-by-hop extension header includes one or more of the following: a first message ID, a first fragment ID, or first security data, wherein the first message ID, the first fragment ID, and the first security data are distinct from the information in the IP fixed header, and wherein the second node has an IPv6 protocol stack comprising a UDP layer, an IPv6 layer, a data link layer, and a layer 1;

executing an application at the second node in an application layer above the UDP layer, wherein the application requires data received by the second node in the first hop-by-hop extension header during execution; and generating a second packet by the second node having a second IP fixed header, a second hop-by-hop extension header, and a second payload, wherein the second hop-by-hop extension header includes one or more of the following: a second message ID, a second fragment ID, or second security data; and transmitting the second packet to a third node.

14. The method of claim 13, wherein the first fragment ID and the second fragment ID support a message length that differs from an IPv6 message length.

* * * * *